United States Patent [19]

David

[11] 4,374,574
[45] Feb. 22, 1983

[54] CONDIMENT GRINDER-DISPENSER

[76] Inventor: Tom David, P.O. Box 541, Nantucket Island, Mass. 02554

[21] Appl. No.: 203,679

[22] Filed: Nov. 3, 1980

[51] Int. Cl.$^3$ .......................... A47J 42/00; B02C 13/30
[52] U.S. Cl. ................................................. 241/169.1
[58] Field of Search ................. 241/168, 169, 169.1, 241/199.12

[56] References Cited

U.S. PATENT DOCUMENTS

| 576,244 | 2/1897 | Williams . | |
|---|---|---|---|
| 1,164,443 | 12/1915 | Yiakas . | |
| 1,321,609 | 11/1919 | Eck . | |
| 1,477,943 | 9/1923 | Crocker . | |
| 1,773,720 | 9/1928 | Alland . | |
| 2,038,041 | 4/1936 | Gutman | 241/169.1 X |
| 2,038,041 | 3/1935 | Gutman . | |
| 2,876,956 | 2/1956 | Bentley . | |
| 3,096,036 | 2/1961 | Cowles et al. . | |
| 3,130,927 | 4/1964 | Schmieding | 241/169.1 |
| 3,827,641 | 8/1974 | Andersson | 241/169.1 X |

FOREIGN PATENT DOCUMENTS

| 348715 | 4/1905 | France . |
|---|---|---|
| 225319 | 4/1943 | Switzerland . |
| 252984 | 10/1948 | Switzerland . |

Primary Examiner—Willie G. Abercrombie
Attorney, Agent, or Firm—Spencer & Kaye

[57] ABSTRACT

A hand-held and hand-operated condiment grinder-dispenser includes a housing adapted to be held by an encircling grip of the user's hand, a grinding mechanism having a rotary grinding wheel and a driving mechanism having an operating lever coupled to the grinding wheel and arranged for a reciprocating motion composed of a manually-induced forward motion and a spring-induced return motion. An overrunning clutch couples the driving mechanism to the grinding wheel for transmitting a torque from the driving mechanism to the grinding wheel solely during the foward motions of the operating lever. The operating lever is positioned with respect to the housing such that it is included in the encircling grip of the user's hand.

8 Claims, 6 Drawing Figures

U.S. Patent  Feb. 22, 1983  Sheet 1 of 2  4,374,574
FIG. 1
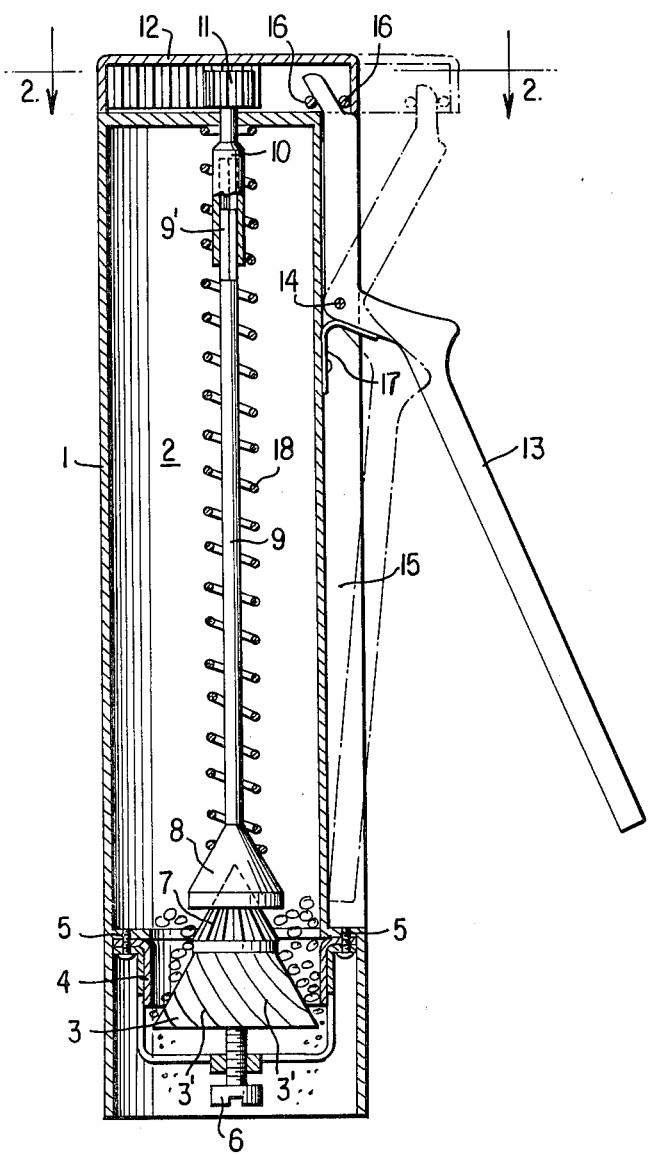
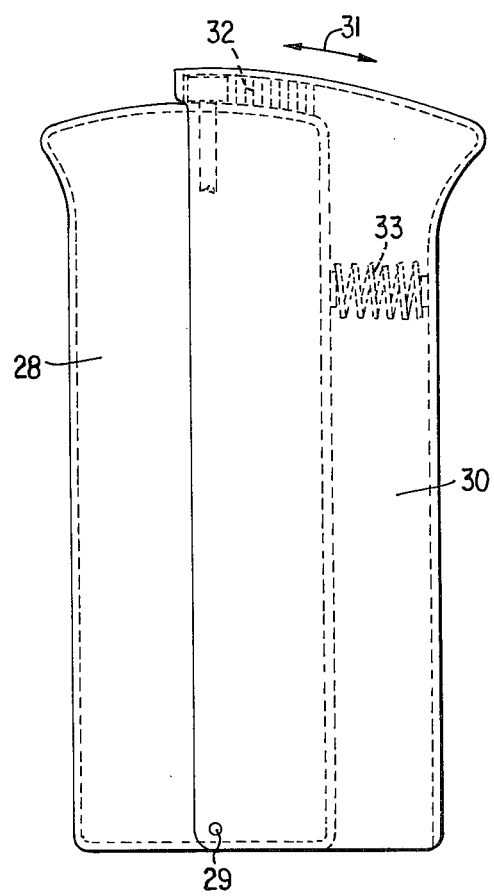
FIG. 5
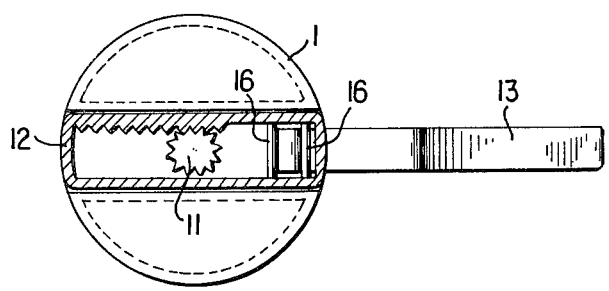
FIG. 2
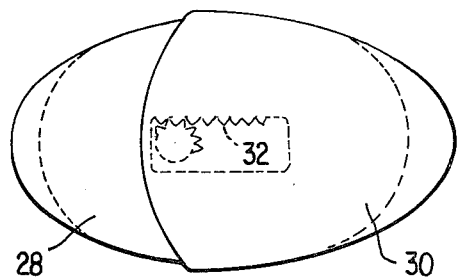
FIG. 6

CONDIMENT GRINDER-DISPENSER

BACKGROUND OF THE INVENTION

This invention relates to a condiment grinder-dispenser and is more particularly concerned with a hand-held and hand-operated pepper mill.

Hand-held and hand-operated spice grinders or pepper mills generally have an elongated body (housing) which encloses a condiment storage chamber and the grinding device which, when operated, dispenses the ground spice through an opening provided in the bottom. The most widely used spice grinders have a cranking arm directly connected to the shaft of the grinding mechanism and turned continuously and unidirectionally with one hand of the user while the other hand holds the mill over the food, generally in a vertical orientation.

It is a disadvantage of spice grinders structured as outlined above that both hands are needed for using them. This is particularly inconvenient, if, for example, the user wishes to stir the food simultaneously. There are, however, condiment grinder-dispensers which are adapted to be held and operated by the same hand.

Thus, French Pat. No. 348,715 discloses a pepper mill in which the crank arm is formed of a straight handle affixed to the grinding shaft and extending perpendicularly thereto. It is adapted to oscillate back and forth through a limited angle whereby the grinding shaft and the milling mechanism likewise execute a back-and-forth rotary oscillation through a limited angle. The user of such pepper mill can grasp the pepper mill body, hold it over the food and utilize his extended index finger to push the lever and then release it to allow a spring to return the lever into its original position.

Swiss Pat. No. 225,319 discloses a salt grinder in which, similarly to the above-described French patent, a straight lever is fixedly attached to a grinding shaft. The grinding shaft axis is generally horizontal during the normal use of the device, while the arm is upwardly oriented and is adapted to be engaged by the index finger and the middle finger of the user. At the same time, the user's thumb rests against a saddle-like extension of the container so that the salt mill is held by a pinching effect of the user's hand and is operated by repeatedly pressing the lever, overcoming the force of a return spring which tends to move the lever back into its farthest position from the thumb rest. Thus, similarly to the structure disclosed in the above-noted French patent, the lever and the grinding mechanism execute a back-and-forth oscillating motion through a limited angle.

Condiment grinders, particularly pepper mills structured in accordance with the above-described prior art have three significant disadvantages: they require such a position of the user's hand that the ease and comfort of operation as well as a secure grip on the pepper mill body leaves much to be desired; further, a relatively strong return spring is needed for dislodging the condiment particles wedged in the grinding mechanism. Such relatively strong springs add to the discomfort of operating the pepper mill and exert relatively large forces on the mechanism and the housing. Also, during the periodic reverse motions of the grinding wheel, the condiment already in the grinding mechanism is thrown back and thus, during the successive grinding steps, an initial part of the wheel rotation is used not for grinding, but solely for drawing the condiment back into the grinding mechanism.

SUMMARY OF THE INVENTION

It is an object of the invention to provide an improved condiment grinder-dispenser which is held and operated by a single hand assuming, at all times, a natural gripping position, which does not need a powerful return spring and in which the entire forward motion of the grinding wheel is used for crushing the condiment.

This object and others to become apparent as the specification progresses, are accomplished by the invention, according to which, briefly stated, the hand-held and hand-operated condiment grinder-dispenser includes a housing adapted to be held by an encircling grip of the user's hand, a grinding mechanism having a rotary grinding wheel and a driving mechanism having an operating lever coupled to the grinding wheel and arranged for a reciprocating motion composed of a manually-induced forward motion and a spring-induced return motion. An overrunning clutch couples the driving mechanism to the grinding wheel for transmitting a torque from the driving mechanism to the grinding wheel solely during the forward motions of the operating lever. The operating lever is positioned with respect to the housing such that it is included in the encircling grip of the user's hand.

BRIEF DESCRIPTION OF THE DRAWING

FIG. 1 is a longitudinal sectional view of a preferred embodiment of the invention.

FIG. 2 is a sectional view taken along line 2—2 of FIG. 1.

FIG. 5 is a side elevational view of a further preferred embodiment of the invention.

FIG. 6 is a top plan view of the structure illustrated in FIG. 5.

DESCRIPTION OF THE PREFERRED EMBODIMENTS

Figure 3:
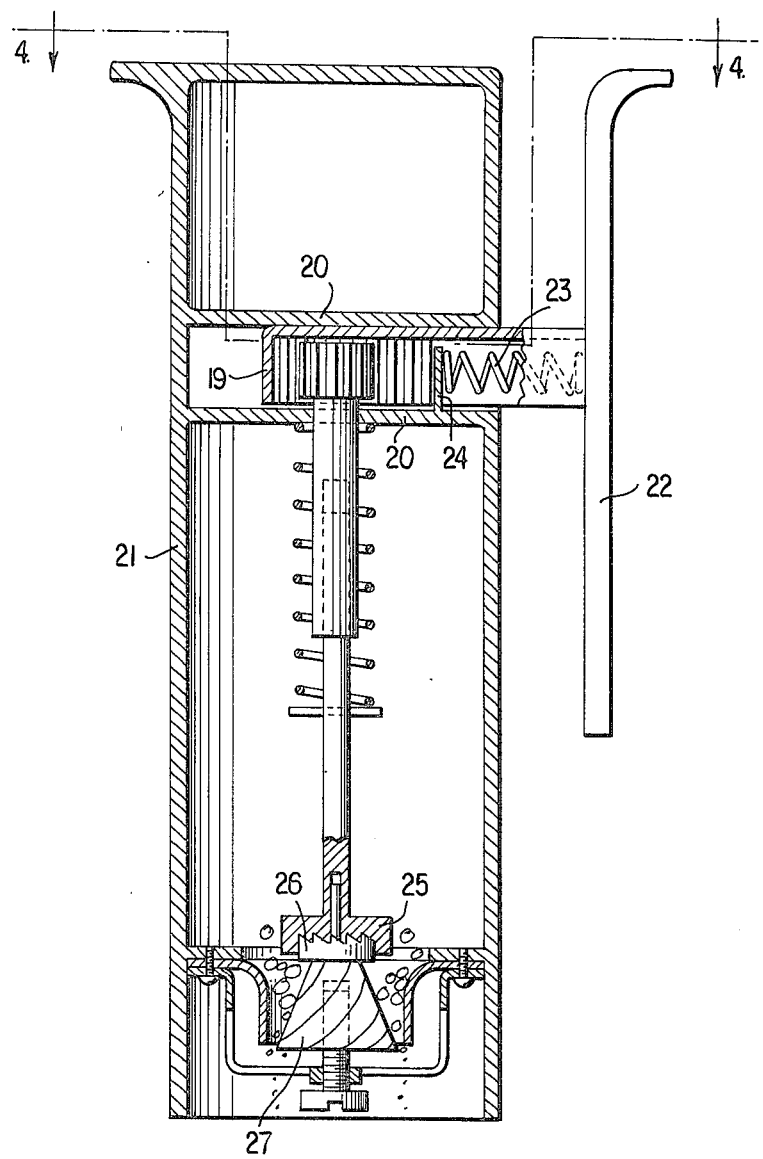
FIG. 3 is a longitudinal sectional view of another preferred embodiment of the invention.

Turning now to FIGS. 1 and 2, the pepper mill shown therein comprises a housing 1 defining a chamber 2 which serves as the reservoir for the peppercorns introduced into the chamber 2 in any convenient conventional manner (for example, through a pivotal lid portion, not shown).

The grinding mechanism comprises a conventionally supported grinding wheel 3 which cooperates with a surrounding skirt 4 secured to the housing 1 at 5. The direction of grinding ridges 3' indicate that the operative (grinding) direction of rotation of the grinding wheel 3 is clockwise as viewed from above (FIG. 2). The clearance between the surface of the grinding wheel 3 and the skirt 4 may be varied by a setscrew 6 for altering the fineness of the ground condiment.

The grinding wheel 3 is rotated by means of an overrunning clutch arrangement constituted in this embodiment by means of interfitting conical toothed gears 7 and 8. The conical gear 7 (driven gear) is affixed to the grinding wheel 3 in a coaxial relationship therewith, whereas the hollow conical gear 8 (driving gear) fits over the gear 7 and is affixed to the lower end of a drive shaft 9. The upper end 9' of the drive shaft 9 has a non-circular (for example, square) cross section and is slidably received in a hollow stub shaft 10 which likewise has a non-circular inner cross-sectional configuration. Thus, the shafts 9 and 10 are adapted to telescope with respect to one another but cannot execute relative rotation with respect to one another and therefore a positive torque transmission between the two shafts is ensured.

The hollow stub shaft 10 is supported at its upper part in an opening provided in an upper transverse wall of the housing 1 and carries a pinion gear 11 situated externally of the chamber 2. The pinion 11 meshes with the teeth of a rack 12 arranged horizontally and linearly slidably on the top of the housing 1. For retaining the rack 12 on the housing 1, the rack 12 may have bilaterally arranged longitudinal flanges which extend into undercut portions provided in the top of the housing 1. A bell crank type operating lever 13 is secured to the housing 1 by means of a pin 14 about which the lever 13 may pivot between a released position (solid line showing) and a fully depressed position (phantom line showing) in a plane that intersects the housing 1 parallel to its length. In the plane of pivotal movement of the operating lever 13 the housing 1 has an elongated, trough-like depression 15 to receive the upper arm or the lower arm of the operating lever 13, dependent upon the end positions thereof. The upper end of the operating lever 13 projects between two spaced pins 16 affixed to the rack 12 whereby a force-transmitting coupling is maintained between the operating lever 13 and the rack 12.

A leaf spring 17 is affixed to the outside of the housing 1 and engages the operating lever 13, continuously urging it into its fully released (solid line) position. In the released state of the operating lever 13 the rack 12 assumes its position as shown in FIG. 1 (in solid lines) and in FIG. 2.

A coil spring 18 surrounds the shafts 9 and 10 and engages, with its upper end, an inner wall face of the housing 1 while, with its lower end, it lies on the outer surface of the conical driving gear 8. The spring 18 is slightly biased so as to continuously urge the conical gear 8 into contact with the conical driven gear 7. The gear teeth on the outside of the conical gear 7 and on the hollow inside of conical gear 8 are so oriented that a torque transmission from the driving gear 8 to the driven gear 7 can occur only in one direction of rotation of the driving gear 8 (which is clockwise in the illustrated embodiment as viewed in FIG. 2).

For holding and operating the above-described pepper mill, the user grasps the housing 1 as one normally would take hold of a rod-like article, with the thumb oriented towards the tip of the other fingers. These other fingers all rest on the outside of the operating lever 13 below the pin 14. The user's hand is thus in a natural "handshake" position, encircling both the housing 1 and the lever 13 which thus may be characterized as a "handgrip" lever.

To operate the mill, a squeezing force is exerted by the hand on the lever 13. As a result, the lever 13 pivots clockwise as seen in FIG. 1, pulls out the rack 12 into its phantom-line position, whereby a clockwise rotation (as viewed in FIG. 2) is imparted on the pinion 11 and the hollow stub shaft 10 affixed thereto. The torque is transmitted to the grinding wheel 3 by means of the drive shaft 9 and the overrunning clutch coupling 7 and 8, whereby the grinding wheel 3 is turned in the operating direction through an extent determined by the effective length of the tooth rack 12 and the diameter of the pinion 11. Thus, during this occurrence pepper is ground and dispensed by the mill.

Thereafter, the lever 13 is released by the user by virtue of weakening the grip thereon and thus the leaf spring 17 moves the operating lever 13 counterclockwise, pushing back the rack 12 towards its full-line position shown in FIG. 1. During this occurrence, the pinion 11 is rotated counterclockwise (as viewed in FIG. 2). A counterclockwise torque, however, is not transmitted by the driving gear 8 to the driven gear 7, since such a counterclockwise rotation of the gear 8 will result in the gear 8 lifting slightly with respect to the gear 7 (overcoming the weak force of the coil spring 18) and rotating freely with respect to the driven gear 7. Consequently, the driven gear 7 and the grinding wheel 3 remain stationary during the return motion of the operating lever 13. The slight separation between gears 7 and 8 during counterclockwise rotation of the gear 8 is feasible by virtue of the telescoping connection between the shafts 9 and 10. The operation may continue with alternating squeezing and releasing as described.

Thus, since during the return motion of the operating lever 13 the grinding wheel 3 remains stationary and thus no frictional force represented by the material jammed between the grinding wheel 3 and the skirt 4 has to be overcome, the leaf spring 17 may have a very small spring force. The force of the leaf spring 17 needs to be sufficient only to overcome the frictional resistance of the grinding mechanism up to but excluding the lower conical gear 7 and the grinding wheel 3 and to overcome the friction generated by the slight force of the coil spring 18 exerted on the tooth faces of the gears 7 and 8. Thus, a rotation of the grinding wheel 3 occurs solely during the milling (grinding) cycle proper and is caused solely by the intermittent manual force exerted on the "handgrip" lever 13.

Figure 4:
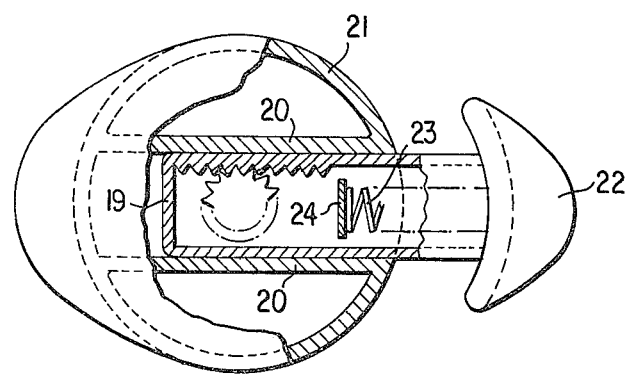
FIG. 4 is a sectional view taken along line 4—4 of FIG. 3.

Turning now to FIGS. 3 and 4, the embodiment shown therein differs from the first-described embodiment essentially only in the structure and arrangement of the hand-operated lever.

A toothed rack 19 which corresponds in structure and function to the toothed rack 12 of the first-described embodiment, is arranged for horizontal sliding motion in a web portion 20 which is situated approximately in the upper third part of the pepper mill housing 21 and forms an integral part thereof. An elongated, essentially linear lever 22 extending parallel to the length dimension of the pepper mill is, approximately at its mid portion, rigidly affixed to the outer end of the rack 19. A spring 23 which has one end engaging an abutment plate 24 affixed to the web 20 and another end engaging the lever 22 urges outwardly the rack-and-lever assembly 19, 22.

The FIG. 3 embodiment further differs from the FIG. 1 embodiment in the particular overrunning clutch mechanism. In this structure, the clutch mechanism is formed of a toothed driving disc 25 continuously coupled to the operating lever 22 and a driven toothed disc 26 affixed to the grinding wheel 27 of the pepper mill. The orientation of the teeth on the disc 25 and 26 is such that a torque from the driving disc 25 can be transmitted to the driven disc 26 only if such driving torque has a counterclockwise direction as viewed in FIG. 4.

Thus, in use, the pepper mill structured according to FIGS. 3 and 4 is grasped by one hand of the user in a manner similar to the first-described embodiment and upon squeezing force exerted by the user's hand, the rack-and-lever unit 19, 22 is pushed inwardly parallel to itself, whereby a counterclockwise rotation of the driving disc 25 is effected, resulting in a corresponding working rotation of the grinding wheel 27. Upon release of the lever 22, the return spring 23 causes the rack-and-lever unit 19, 22 to move outwardly whereby a clockwise rotation of the driving disc 25 results. During such clockwise rotation the driving disc 25 rides up slightly on the driven disc 26 and rotates relative thereto; the driven disc 26 and the grinding wheel 27 thus remain stationary.

It is to be understood that the overrunning clutch mechanisms 7, 8 and 25, 26 are interchangeable in the two embodiments and furthermore, any other appropriate overrunning clutch mechanism could be used in the alternative to ensure that the grinding wheel rotates only when the manual squeezing force is exerted to the grinding mechanism and thus the grinding wheel remains stationary when the return spring moves the respective lever back upon manual release.

A further embodiment is illustrated in FIGS. 5 and 6. In the pepper mill structure illustrated therein, to the bottom of the mill housing 28 there is secured, by means of a pin 29 an outer shell 30 which partially surrounds the housing 28 and which is adapted to execute swinging motions about the pivot pin 29 as illustrated by the double-headed arrow 31. The shell 30 extends along the housing 28 and generally conforms to the housing outline. The pivotal shell component 30 includes in an upper inner zone an integral toothed rack portion 32 whose function corresponds to the respective racks 12 and 19 of the two previously described embodiments. Thus, in the embodiment illustrated in FIGS. 5 and 6, the shell 30 functions as the operating lever for the pepper mill whose grinding and dispensing structure may be identical to those described in connection with FIGS. 1 through 4. In use, the housing 28 and the shell 30 are together encircled by the user's handgrip and a repeated squeezing can be effected in a particularly convenient manner. A return spring 33 is positioned between an outer wall of the housing 28 and an inner wall of the shell 30 for continuously urging the shell into the end position which is shown in FIGS. 5 and 6 and which the shell 30 assumes in the released state.

It is a characteristic feature of all three embodiments described above that the pepper mill can be held and operated with a comfortable, natural "handshake" position which ensures not only a convenient, effortless operation but also ensures the best grip possible on the condiment grinder-dispenser.

It will be understood that the above description of the present invention is susceptible to various modifications, changes and adaptations, and the same are intended to be comprehended within the meaning and range of equivalents of the appended claims.

What is claimed is:

1. A hand-held and hand-operated condiment grinder dispenser comprising in combination:
    (a) a housing adapted to be held by an encircling grip of the user's hand;
    (b) a grinding mechanism mounted in said housing and including a rotary grinding wheel and a skirt surrounding said grinding wheel and cooperating therewith for comminuting and dispensing condiment upon rotation of said grinding wheel in a sole, operative direction;
    (c) an overrunning clutch mounted in said housing and having a driven part connected to said grinding wheel for rotating therewith as a unit; said clutch further having a driving part rotatable in an operative direction and in an opposite, inoperative direction; said driving part transmitting an operating torque to said driven part solely when said driving part rotates in said operative direction thereof; the direction of said operating torque coinciding with said operative direction of said grinding wheel;
    (d) an operating lever mounted on said housing to be movable in a forward direction and in a return direction; said operating lever being coupled to said driving part of said clutch for rotating said driving part in the operative direction thereof when said operating lever moves in said forward direction and for rotating said driving part in the inoperative direction thereof when said operating lever moves in said return direction; said operating lever being positioned with respect to said housing such that said operating lever being included in the encircling grip of the user's hand for effecting said forward motion; and
    (e) a spring urging said operating lever in the return direction, whereby upon release of said operating lever by the user's hand after a motion of said operating lever in the forward direction, said spring moves said operative lever in the return direction and further moves said driving part of said clutch in the inoperative direction relative to said driven part of said clutch and relative to said grinding wheel of said grinding mechanism.

2. A condiment grinder-dispenser as defined in claim 1, wherein said housing has a length dimension and further wherein said operating lever is a bell crank lever pivotally supported on said housing for a swinging motion in a plane passing through said housing along said length dimension; said bell crank lever having a first arm operatively connected to the driving part of said overrunning clutch and a second arm arranged for being encircled by the user's handgrip.

3. A condiment grinder-dispenser as defined in claim 2, further comprising means defining a trough-like depression along the length dimension of said housing generally symmetrically to said plane for receiving said first or said second arm dependent upon the pivotal position of said bell crank lever.

4. A condiment grinder-dispenser as defined in claim 2, further comprising a toothed rack slidably supported by said housing and a pinion gear meshing with said toothed rack and being continuously torque-transmittingly coupled to said driving part of said overrunning clutch; said first arm being articulated to said toothed rack.

5. A condiment grinder-dispenser as defined in claim 1, wherein said housing has a length dimension; further comprising a toothed rack supported by said housing for a sliding motion perpendicularly to said length dimension and a pinion gear meshing with said toothed rack and being continuously torque-transmittingly coupled to the driving part of said overrunning clutch; said operating lever being fixedly attached to said toothed rack and extending generally parallel to the length dimension of said housing.

6. A condiment grinder-dispenser as defined in claim 1, wherein said housing has a length dimension and further wherein said operating lever is a shell pivotally secured to said housing and extending in the length dimension thereof; said shell partially surrounding said housing and generally conforming to the outline thereof.

7. A condiment grinder-dispenser as defined in claim 6, further comprising a toothed rack formed on an inner face of said shell and a pinion meshing with said toothed rack.

8. A condiment grinder-dispenser as defined in claim 1, wherein said overrunning clutch comprises a first conical gear having teeth on an outer conical face thereof and a second, hollow conical gear having teeth on an inner conical face thereof; said gears being arranged in a coaxial interfitting relationship; one of said gears being said driving part continuously torque-transmittingly connected to said operating lever and the other of said gears being the driven part continuously torque-transmittingly connected to said grinding wheel; said teeth on said gears being so oriented that a torque-transmitting connection between said gears is effected solely upon rotation of said driving gear in the operative direction thereof.

* * * * *